Feb. 24, 1925. 1,527,798
W. G. HAWLEY
AUTOMOBILE BRAKE
Filed Oct. 12, 1922 4 Sheets-Sheet 1

WITNESSES
INVENTOR
William G. Hawley
BY
Knight Bro
ATTORNEYS

Feb. 24, 1925.

W. G. HAWLEY

AUTOMOBILE BRAKE

Filed Oct. 12, 1922

WITNESSES

INVENTOR
William G. Hawley
BY Knight Bros.
ATTORNEYS

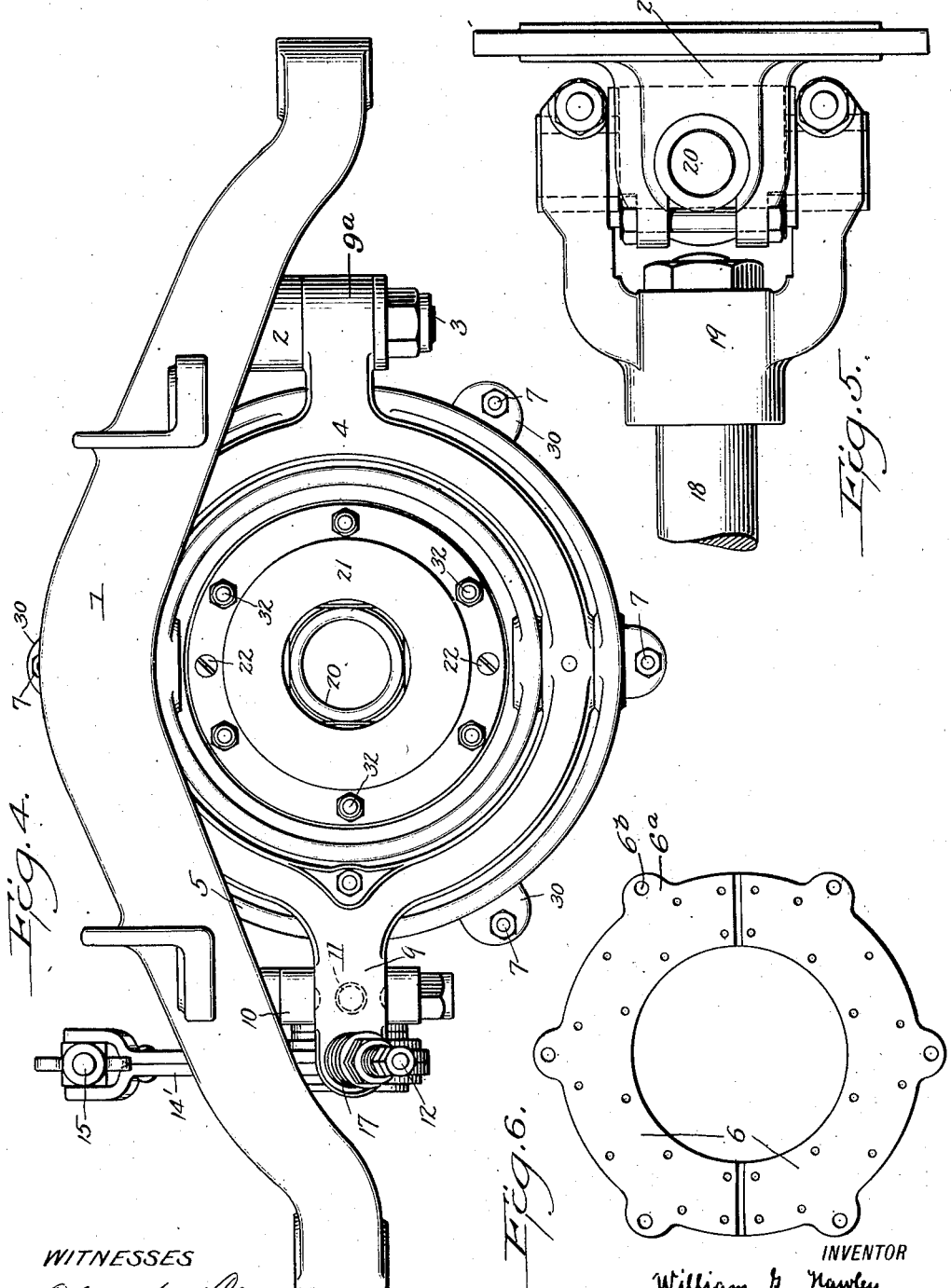

Feb. 24, 1925.

W. G. HAWLEY

AUTOMOBILE BRAKE

Filed Oct. 12, 1922

WITNESSES
Oliver W. Holmes

INVENTOR
William G. Hawley
BY Knight Bro
ATTORNEYS

Patented Feb. 24, 1925.

1,527,798

UNITED STATES PATENT OFFICE.

WILLIAM G. HAWLEY, OF ELMIRA, NEW YORK.

AUTOMOBILE BRAKE.

Application filed October 12, 1922. Serial No. 594,144.

*To all whom it may concern:*

Be it known that I, WILLIAM G. HAWLEY, a citizen of the United States, and a resident of Elmira, county of Chemung, and State of New York, have invented certain new and useful Improvements in Automobile Brakes, of which the following is a specification.

My present invention relates to that class of automobile brakes that are applied to the driving shaft. Such brakes are as a rule made with a brake drum on the driving shaft and two semi-cylindrical brake shoes which are made to clamp onto the brake drum by suitable levers.

In my present invention I employ a brake disc instead of a drum with brake shoes clamping the side faces of the disc and I so construct the disc and shoes as to provide a free circulation of air in and thru them for the purpose of preventing overheating. The invention further relates to improved means for obtaining a better distribution and more effective application of the braking power upon the oppositely presented braking surface which extend around the lateral faces of the brake disk. For this purpose, my invention contemplates an annular brake shoe extending entirely around the axis of the brake disk on either side thereof, said shoe being carried by coaxial pivots arranged on opposite sides of said axis and mounted on a power applying yoke. Said yoke on either side of the brake disk preferably comprises a circular intermediate portion corresponding to the brake shoe and oppositely extending portions by means of one of which the lever is pivotally mounted on a fixed frame and by means of the other of which the lever may have power applied thereto.

In the drawings:—

Figure 4 is an end elevation of the brake and its supporting frame;

Figure 5 is a detail of the universal coupling;

Figure 6 is a view of the brake shoe;

Figure 1:
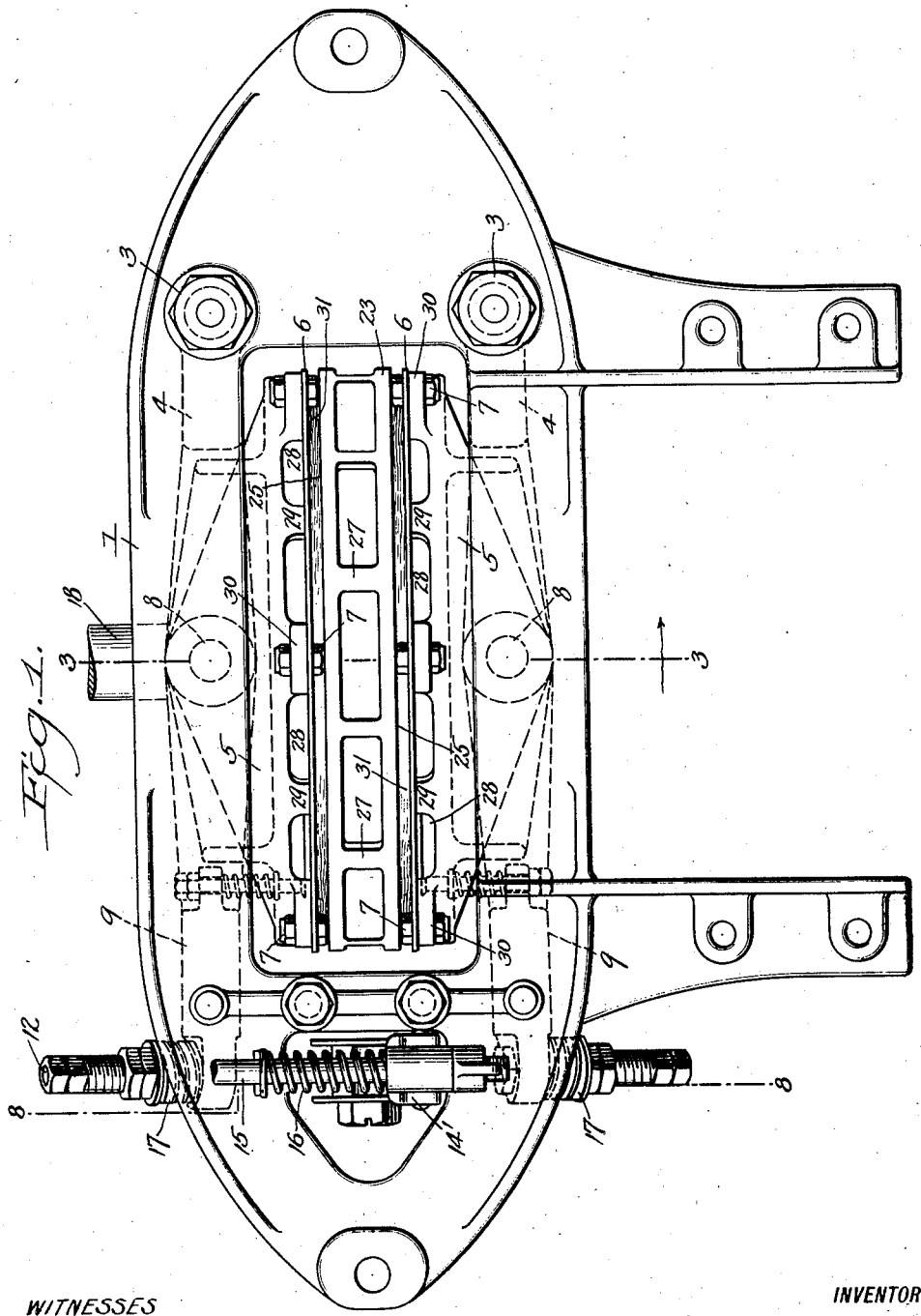
Figure 1 represents in plan a view of my improved brake and its support.
Figure 2:
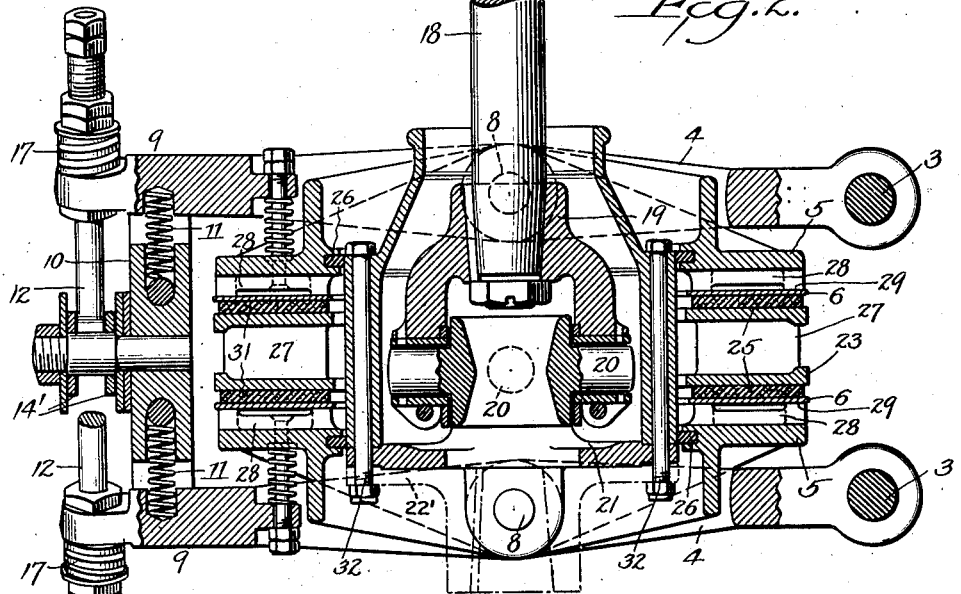
Figure 2 is a horizontal section thru the brake on the plane of the axis of the driving shaft.
Figure 3:
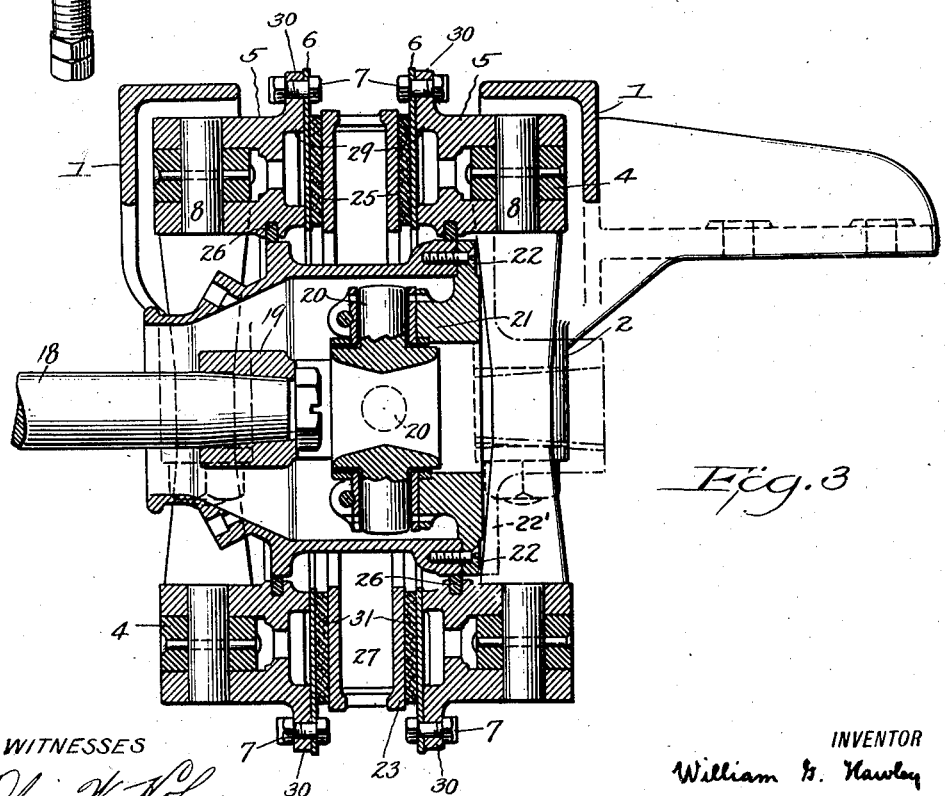
Figure 3 is a vertical section thru the plane of the axis of the driving shaft.
Figure 7:
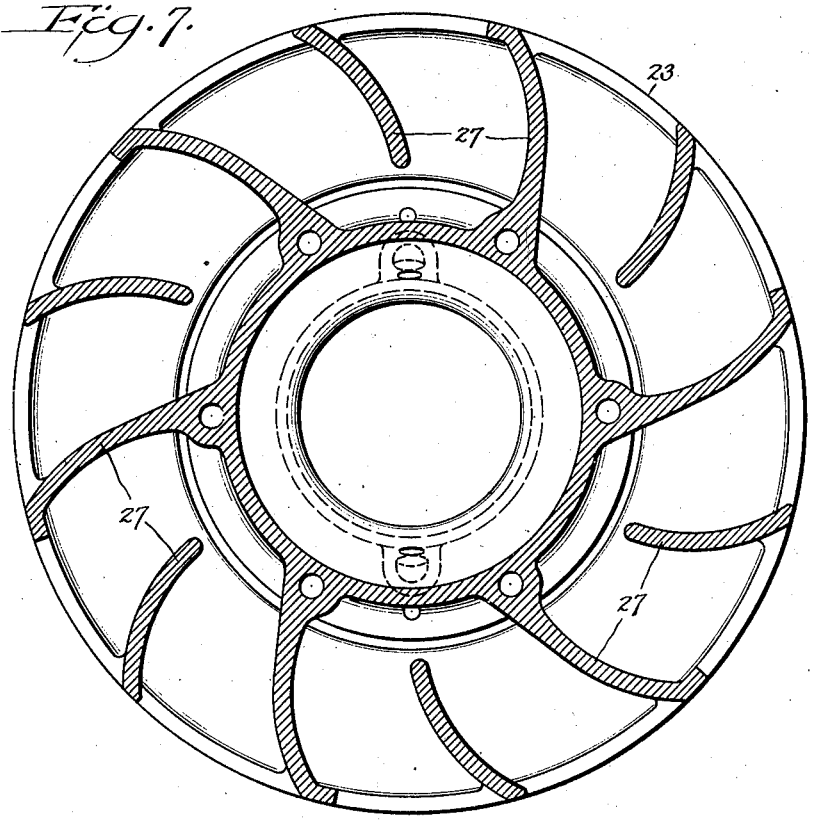
Figure 7 is a section transverse to the axis thru the middle of the brake disc.
Figure 8:
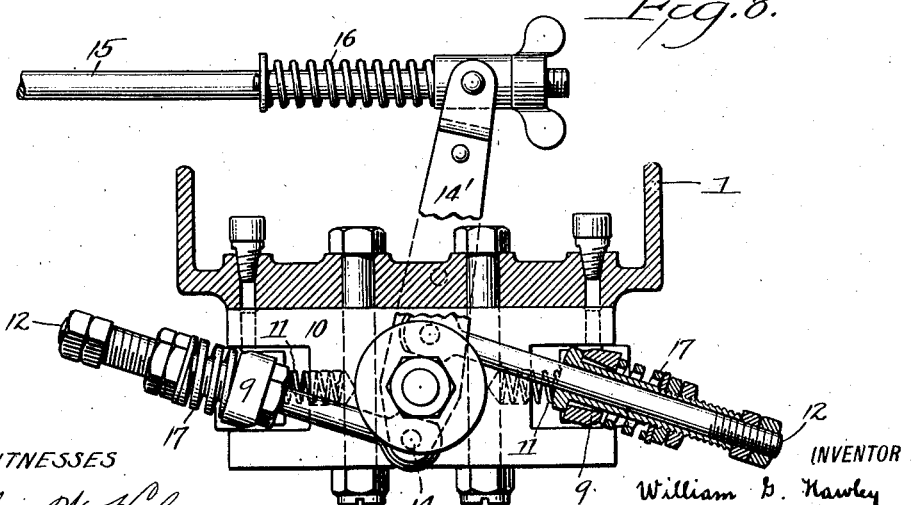
Figure 8 is a side view and section showing the operating levers of the brake.

Referring to the drawings there is shown at 1 a supporting frame from which depend lugs 2 and bolts 3, the latter forming hinge pins for yokes 4 upon which are mounted brake shoe supports 5; the brake shoes 6 being secured thereto by bolts 7, (see Figures 1 and 3). By an inspection of Figures 2, 3 and 4, it will be seen that each of the yokes 4 includes a ring-shaped portion intermediate to its ends which corresponds to the brake shoes 6 and brake-shoe supports 5 in extending completely around the axis of the central brake disc 23 to be hereinafter referred to. The brake shoe supports are mounted on and are articulated to the yokes by pivot pins 8 (see Figure 3) which are coaxially mounted on opposite sides of the axis of said brake disc so that the supports are free to press uniformly against the sides of the brake disc, notwithstanding the angular movements of the yokes. The free ends of the yokes at 9 are guided by bracket 10 and are normally held apart so as to release the brake by springs 11 operating between the bracket and the free ends of the yokes. The yokes are brought together to apply the brakes by brake rods 12 which are articulated at point 14 to brake lever 14' which in turn is operated by brake rod 15 in connection with any suitable pedal or lever at the command of the driver. A spring 16 on brake rod 15 and spring 17 on brake rods 12 are interposed between said rods and their end nuts to give the proper degree of elasticity and lost motion. A driving shaft 18 carries a yoke 19 in which is journalled a spider 20, the other arms of the spider being journalled in plate 21 to which is bolted a flange 22' mounted on the other part of the driving shaft. To the plate 21 is also secured by bolts 22 the brake disc 23 which has a central hub that forms a housing for the universal joint and also has two peripheral rims 25 against which impinge packing rings 26 set in slots in the brake shoe supports. The brake disc itself is made hollow as shown in Figures 1, 2, 3 and 7, with spiral ribs 27 connecting these two sides and the central hub. These ribs are made in spiral form as shown in Figure 7 and act as fan vanes to drive the cooling air thru the disc. It is not necessary to have all the vanes connect with the hub and as shown in Figure 7, I prefer to have only the alternative ones do so. The brake shoe supports are also provided with air ducts 28 as shown in Figure 2, the same being formed by radial ribs 29 (see Figure 1) which form the support for the brake shoes which are secured to said support by bolts 7 passing thru lugs 30 on the exterior peripheries of the said supports. The diameter of the hub portion of the brake disc is less than the internal diameter of the annular braking disc and the brake shoe supports, so that an air passage is formed whereby the air can pass in thru the stationary support, and then into the annular space next to the hub and into the interior of the disc where it will be expelled by the fan action of the vanes 27. At 31 I show the brake lining which is made of the usual material and it will be seen that both the metal surfaces, namely, the brake shoe and the annular braking surface of the hollow disc have the cooling air brought as near as possible to the source of heat. This inforced passage of air close to the braking surface is further aided by packing rings 26. The lugs 30 project sufficiently beyond the body of the brake to enable the bolts 7 to be taken out and the brake shoe and lining 6 and 31 removed without disturbing other members of the brake. In order to facilitate this removal of the brake shoe and the lining without disturbing the other parts I make the same in halves divided diametrically as shown in Figure 6. An inspection of this figure of the drawings, will show that in the present embodiment of my invention both halves of the brake shoe 6 have radially projecting lugs 6ª provided with holes 6ᵇ adapted to receive the bolts 7. In this way, these parts are suitably mounted without obstructing the space around their outer peripheries so that they may be readily removed without dismantling the brake mechanism when said mechanism is in released position. In this connection it is to be noted that the yokes 4 are entirely supported by their oppositely extending arms 9 and 9ª, which lie substantially in a horizontal plane thru the axis of the brake disk and therefore leave the peripheral edge of brake disk and brake shoes entirely unencumbered.

A valuable feature of the brake constructed along these lines resides in the fact that any slight misalignment of the rotating and stationary parts do not give rise to any undue strains or wear, differing in this respect from ordinary brakes where the alignment must be much more accurate. In my brake any movement due to misalignment takes place parallel to the braking surfaces and the said surfaces can therefore slide upon each other to accommodate such movement, whereas in brakes of the cylindrical type the movement would be normal to the braking surfaces and would result in undue strains being brought to bear upon the braking members and the driving mechanism.

The hub of the hollow brake disc is closed at one end by the plate 21 which is secured to it by through bolts 32 and at the other end tapers inwardly to a mouth around the driving shaft. There is thus formed a housing around the universal joint by this hub of the brake disc thus making of the whole a compact as well as a well protected piece of mechanism.

I claim:—

1. An automobile brake comprising a rotary brake disc provided with oppositely presented lateral braking surfaces, ring-shaped brake shoes adapted to cooperate respectively with said braking surfaces, and power-applying yokes connected respectively to said ring-shaped brake shoes and pivotally mounted independently of said brake disc on axes substantially parallel to the central plane of said brake disc.

2. An automobile brake having a braking disc with orifices thru it for the circulation of air, a brake shoe and a brake shoe support, the latter also having orifices for the circulation of air, the brake shoe closing one side of said orifices.

3. An automobile brake having a brake disc, an annular brake shoe, an annular brake shoe support extending beyond the periphery of said brake disc, and means releasably connecting said brake shoes to portions of said brake shoe supports extending beyond said brake disc.

4. An automobile brake comprising a rotary shaft, a brake disc provided with a laterally presented braking surface, a brake shoe extending entirely around said shaft, and comprising separable sections, a brake shoe support common to said brake shoe sections and movable axially with respect to said shaft, and means for separately securing each of said brake shoe sections to said common brake shoe support.

5. An automobile brake comprising a rotary brake disc provided with oppositely presented lateral braking surfaces, ring shaped brake shoes constructed in separately removable sections, ring shaped levers articulately connected to said brake shoes within the peripheries thereof and pivotally mounted on fixed axes, and means for operating said ring shaped levers to press said brake shoes against said brake disc.

6. In an automobile the combination of a driving shaft, a universal joint in said shaft, a brake disc having a hub portion forming a housing around the universal joint, said disc being provided with air ducts, brake shoes facing each side of said disc and brake shoe supports provided with supporting ribs for said shoes and forming with them air ducts leading to the air ducts in the brake disc.

7. In an automobile, the combination with a rigid frame, of a rotary brake disc provided with oppositely presented lateral braking surfaces, ring-shaped brake shoes provided with laterally presented braking surfaces corresponding respectively to the first mentioned braking surfaces, yokes arranged on opposite sides of said brake disc, each of said yokes being pivoted at one end and having a ring-shaped portion intermediate to its ends to correspond to the ring-shaped brake shoe, and pivots carried by said ring portion on opposite sides of the axis of said brake disc for pivotally supporting said brake shoe.

8. In an automobile, the combination of a driving shaft, a universal joint in said shaft, a brake disc having a portion forming a housing around said universal joint, said brake-disc being provided with oppositely presented braking surfaces extending outwardly from said housing, and annular brake shoes extending around said housing and adapted to be moved laterally into braking engagement with said brake disc.

9. The combination with a driving shaft, of a brake therefor comprising a rotary brake disk provided with oppositely presented lateral braking surfaces, of a pair of axially movable brake shoe supports movable towards and away from said lateral braking surfaces, brake shoes mounted upon said supports, and means arranged adjacent the horizontal axial plane of said brake disk for supporting the entire weight of said brake shoe supports independently of said shaft whereby the peripheries of said brake disk and brake shoes are left unencumbered above and below said horizontal axial plane, said brake shoes being constructed in separately removable sections.

WILLIAM G. HAWLEY.